(12) United States Patent
Claude et al.

(10) Patent No.: US 9,368,807 B2
(45) Date of Patent: Jun. 14, 2016

(54) CONDUCTING PLATES FOR FUEL CELL ELEMENTS

(71) Applicants: L'Air Liquide Societe Anonyme pour l'Etude et l'Exploitation des Procedes Georges Claude, Paris (FR); Arcelormittal-Stainless & Nickel Alloys, Saint-Denis (FR)

(72) Inventors: Eric Claude, Fontaine (FR); Richard Bosquet, Fontaine (FR); Gilles Platen, Fontaine (FR); Claude Roussel, Fontaine (FR)

(73) Assignees: L'AIR LIQUIDE SOCIETE ANONYME POUR L'ETUDE ET L'EXPLOITATION DES PROCEDES GEORGES CLAUDE, Paris (FR); APERAM ALLOYS IMPHY, Imphy (FR)

( * ) Notice: Subject to any disclaimer, the term of this patent is extended or adjusted under 35 U.S.C. 154(b) by 0 days.

(21) Appl. No.: 13/866,274

(22) Filed: Apr. 19, 2013

(65) Prior Publication Data

US 2013/0330656 A1    Dec. 12, 2013

Related U.S. Application Data

(63) Continuation of application No. 12/307,002, filed as application No. PCT/EP2007/056088 on Jun. 19, 2007, now abandoned.

(30) Foreign Application Priority Data

Jun. 30, 2006  (EP) ..................... 06291083

(51) Int. Cl.
*C22C 19/05* (2006.01)
*H01M 8/02* (2016.01)
*H01M 4/80* (2006.01)
*C22C 38/04* (2006.01)
*C22C 38/06* (2006.01)
*C22C 38/44* (2006.01)
*C22C 38/46* (2006.01)
*C22C 38/50* (2006.01)
*C22C 38/54* (2006.01)
*C22C 38/58* (2006.01)

(52) U.S. Cl.
CPC ............. *H01M 8/0208* (2013.01); *C22C 19/05* (2013.01); *C22C 38/04* (2013.01); *C22C 38/06* (2013.01); *C22C 38/44* (2013.01); *C22C 38/46* (2013.01); *C22C 38/50* (2013.01); *C22C 38/54* (2013.01); *C22C 38/58* (2013.01); *H01M 4/80* (2013.01); *H01M 8/021* (2013.01); *Y02E 60/50* (2013.01); *Y02P 70/56* (2015.11); *Y10T 428/12993* (2015.01)

(58) Field of Classification Search
CPC ....... H01M 4/80; H01M 8/0208; C22C 19/05
See application file for complete search history.

(56) References Cited

U.S. PATENT DOCUMENTS 5,753,178 A *  5/1998  Davidson et al. ............... 420/53
5,989,740 A * 11/1999  Tomimatsu et al. .......... 429/478
7,172,662 B2 *  2/2007  Usami et al. .................. 148/433

* cited by examiner

*Primary Examiner* — Stuart Hendrickson
(74) *Attorney, Agent, or Firm* — Patzik, Frank & Samotny Ltd.

(57) ABSTRACT

The present invention relates to a fuel cell element having an active core interposed between a first and second conducting plate, wherein at least the first conducting plate is made from an alloy having, in percentages by weight, 24.0 to 27.0% nickel; 13.5 to 16.0% chromium; 1.90 to 2.35% titanium; 1.0 to 1.5% molybdenum; 0.10 to 0.50% vanadium; at most 0.08% carbon; at most 2.0% manganese; at most 1.0% silicon; at most 0.35% aluminum; at most 0.03% sulphur; and at most 0.01% boron, the balance consisting of iron and impurities.

10 Claims, 6 Drawing Sheets

CONDUCTING PLATES FOR FUEL CELL ELEMENTS

RELATED APPLICATIONS

This application is a continuation of U.S. patent application Ser. No. 12/307,002, filed Dec. 4, 2009, which is the National Stage of International Application No. PCT/EP07/56088, filed Jun. 19, 2007, which claims priority from Application No. EP06291083.1, filed Jun. 30, 2006, all of which applications are hereby incorporated in their entirety by reference.

FIELD OF THE INVENTION

The present invention relates to conducting plates for fuel cell elements.

BACKGROUND OF THE INVENTION

For many years research has been conducted with view to developing new energy production systems that counter the steady depletion of oil reserves and that at the same time take into account current and future requirements in combating pollution and the associated climate changes.

In this regard, fuel cells constitute a non-polluting source of electricity. They are current generators of the electrochemical type, the operating principle of which consists in passing a fuel, generally hydrogen, over an anode so as to generate, in the presence of a catalyst (such as platinum), protons which, after they have passed through an electrolyte such as a polymer membrane come into contact with an oxidizer, generally oxygen, which is generated at the cathode, in order to produce water, in combination with electrons which also come from the anode. The water is discharged from the system, as is the heat generated. The circulation of the electrons from the anode to the cathode produces electricity.

The hydrogen used in fuel cells constitutes an almost inexhaustible planet-wide element. It can be produced by the electrolysis of water by renewable energy means, for example hydroelectric, wind or solar power, or by means of a source of nuclear power. Alternatively, it can be produced by the reforming of natural gas or by the gasification and then thermochemical reforming of biomass.

Fuel cells may find various applications, in particular in the development of "clean" vehicles, that is to say those not emitting carbon dioxide or other pollutants potentially harmful to the environment or to human health, or in the development of low-power portable systems such as mobile telephones and portable computers.

In general, a fuel cell comprises a stack of several cell elements, each of which consist of an electrolyte, such as a proton exchange membrane or PEE, sandwiched between the anode and the cathode, the whole assembly constituting an active core or MEA (Membrane/Electrode Assembly) which is itself contained between two conducting plates. Current collectors are provided at the ends of the stack of cell elements.

The conducting plates include channels into which the feed gases flow and from which the water is discharged. They may be of the monopolar or bipolar type. The term "monopolar" is understood to mean that each cell element comprises an anode plate and a cathode plate in direct contact (or in contact via a separator consisting of a corrugated conducting metal plate) with the respective cathode and anode plates of the adjacent cell elements. The term "bipolar" is understood to mean that each plate comprises an anode face and a cathode face and, by itself, ensures connection between two adjacent cell elements. In general, a coolant is made to circulate in channels formed in the bipolar plate or formed between two adjacent monopolar plates or else in passages provided in the corrugated separator plate.

A gas diffusion layer or GDL, consisting of conducting fibres, is in principle interposed between each electrode and the plate that faces it.

The conducting plates are conventionally made of graphite or a carbon/polymer composite, or metal plates.

Graphite makes it possible to achieve good performance because of its high electrical and thermal conductivities and its low contact resistance. It can also easily be machined, offering the possibility of optimizing the geometry of the channels passing through it. Finally, its high corrosion resistance guarantees the longevity of the cell element core. However, machining graphite is a lengthy and expensive operation, whatever the volume of production, its use being reserved for laboratory cell elements and a few prototypes.

A carbon/polymer composite allows plates to be obtained by moulding, which considerably reduces the costs. However, although 10 to 20 times less expensive than graphite plates of the same dimensions, carbon/polymer composite plates remain too heavy for mass markets, such as the automobile market. Moreover, the performance of this material is inferior to that of graphite, because of a lower conductivity and less favourable channel geometries as result of the manufacturing constraints.

Stainless steel in fact constitutes the material the best suited to the mass production of fuel cells, with a cost from 5 to 10 times less than that of carbon/polymer composites. It allows the production of plates offering good electrical and thermal conduction, combined with satisfactory mechanical strength of the cell elements. It also has the advantage of being lightweight, occupying little space and able to be subjected to many proven assembly techniques.

However, stainless steel has certain drawbacks that remain to be overcome, namely:

the electrical surface resistance of this material, inherent due to the presence of an oxide layer (or passive film) on the surface of the metal, reduces the performance of the cell elements as a result of ohmic losses occurring at the interface between the conducting plate and the gas diffusion layer;

corrosion of the metals, in particular chromium, in the acid reducing medium of the fuel cell releases cations which, by contaminating the cell membranes, limit their lifetime; and limited optimization of the plate geometry because of difficulty in forming the material.

It has already been suggested in Application U.S. 2002/0172849 to use nickel-chromium austenitic alloys to manufacture bipolar plates having high conductivity and good corrosion resistance. These alloys contain at least 50% by weight of chromium and nickel, the nickel being preferably predominant. The best properties of these alloys, compared with 316 stainless steel conventionally recommended for this use, are attributed to their high nickel content.

Moreover, a comparison of the performance of bipolar plates having various chemical compositions has been presented in the publication by D. P. Davies et al., "Stainless steel as a bipolar plate material for solid polymer fuel cells", *Journal of Power Sources* 86 (2000) 237-242. Among the 316, 310 and 904L stainless steel plates tested, containing 18 to 25% chromium and 12 to 25% nickel, that made of 904L stainless steel proved to deliver a power density close to that of graphite plates and markedly superior to that of 316 stainless steel. This better performance of 904L steel is attributed to the higher proportion of nickel and chromium that it contains, its performance being assumed to result from a thinner oxide film, which therefore has a lower resistivity.

Furthermore, Application FR-2 860 104 has suggested a fuel cell configuration making it possible to obtain a high surface area for contact between a monopolar plate and the corresponding diffusion layer, and thus to reduce the electronic contact resistance between these two elements with a view to improving both the efficiency and the power of the cell for a given current density. To do this, the surface of the plate is roughened by sandblasting, filing or abrasion, so as to be suited, or even matched, to that of the diffusion layer. This post-treatment is potentially more expensive than the "native" treatment according to the invention.

However, there remains the need to have stainless steel conducting plates that allow the manufacture of fuel cell elements having a performance and a lifetime that are comparable to those of cell elements comprising machined graphite plates, whilst still being less expensive.

SUMMARY OF THE INVENTION

Now, the Applicants have discovered that the use of one particular alloy grade, called A286 according to the ASTM standard, allows this requirement to be met. A process for manufacturing conducting plates, likewise allowing this requirement to be met, has also been developed.

The alloy grade A286 has been described in Application CA-518181. This is a ferrous alloy of the austenitic type containing chromium, nickel and titanium, which is described as having good ductility and high mechanical strength at high temperature, which properties can be exploited for the manufacture of aircraft engines exposed to high stresses, especially thermal stresses. This alloy can be subjected to a solution heat treatment at a temperature close to 980° C. (1800° F.) followed by a tempering operation, and can be age-hardened. More recently, it has been suggested to use A286 grade alloys for various applications in the aeronautical field, the automotive field (turbocomponents, exhaust manifolds), energy field (turbines) and oil industry.

However, to the knowledge of the Applicant it has never been suggested to use this alloy grade for the manufacture of fuel cells. It is apparent to the Applicants that this material has a low electrical surface resistance combined with good corrosion resistance and a cost economically compatible with the envisaged use.

The subject of the invention is therefore, according to a first embodiment, the use, for the manufacture of a monopolar or bipolar conducting plate for a fuel cell element, of at least one alloy comprising, in percentages by weight:
24.0 to 27.0% nickel;
13.5 to 16.0% chromium;
1.90 to 2.35% titanium;
1.0 to 1.5% molybdenum;
0.10 to 0.50% vanadium;
at most 0.08% carbon;
at most 2.0% manganese;
at most 1.0% silicon;
at most 0.35% aluminium;
at most 0.03% sulphur; and
at most 0.01% boron,
the balance consisting of iron and impurities.

The aforementioned alloy corresponds to a stainless steel of A286 grade, defined by reference to the ASTM standard, it is also identified by the reference S66286 according to the UNS standard and 1.4943 according to the WNr standard.

The term "impurities" is understood for the purpose of the present invention to mean elements that are unavoidably present and result from the process for manufacturing the alloy. These are in particular nitrogen, phosphorus, selenium, copper, zirconium, cerium and/or lanthanum.

A preferred alloy for use in the present invention contains:
24.0 to 25.5% nickel;
14.0 to 16.0% chromium;
2.00 to 2.30% titanium;
1.2 to 1.5% molybdenum;
0.10 to 0.50% vanadium;
at most 0.06% carbon;
at most 2.0% manganese;
at most 0.3% silicon;
at most 0.25% aluminium;
at most 0.01% sulphur; and
at most 0.01% boron,
the balance consisting of iron and impurities.

Another subject of the invention, according to a second embodiment, is a sheet comprising at least one alloy as defined above, characterized in that it has, at least on one of its faces, an arithmetic mean roughness Sa of 0.12 µm or higher, a maximum height amplitude St of less than 4 µm and, preferably, a developed area Sdr of greater than 0.2%.

The term "sheet" is understood within the present invention to mean a rolled product in sheet form, with a substantially flat surface and substantially rectangular cross section.

The sheet having these characteristics will be defined, later on in this description, by "surfaced sheet".

The parameters Sa, St and Sdr are 3D surface finish parameters defined with respect to a mean plane obtained by rectification, by the plane of the mean squares of the measured surface, and then by centering the heights about the mean. They may be determined from a recording of the surface topography, which can be obtained in particular by a tactile sensor. The construction of the surface topography in 3D is accomplished by measuring a series of N parallel profiles made up of M points, uniformly spaced apart, so as to cover a rectangular surface. A recording of the height z as a function of the position x in the profile, and the position y of the profile in the surface, are obtained.

The expression "arithmetic mean roughness Sa" is understood to be the arithmetic mean of the deviations from the mean:

$$Sa = \frac{1}{a} \int \int_a |z(x, y)| dx dy$$

The arithmetic mean roughness of the sheet according to the invention is preferably greater than 0.12 µm and generally less than 0.36 µm.

The expression "maximum height amplitude St" is understood to be the total height of the surface, defined by the difference between the height of the highest peak and the depth of the deepest trough. This parameter is determined by extrapolation with respect to the 2D parameter. The maximum height amplitude St of the sheet according to the invention is preferably less than 4 µm and generally greater than 1.5 µm.

The expression "developed surface area Sdr" is understood to be the ratio of the increment in the interfacial region of a surface with respect to the test region:

$$S_{dr} = \frac{\sum_{j=1}^{N-1} \sum_{i=1}^{M-1} A_{i,j} - (M-1)(N-1)\Delta x \Delta y}{(M-1)(N-1)\Delta x \Delta y} \times 100\%$$

in which M is the number of points per profile, N is the number of profiles and $A_{i,j}$ represents the interfacial region, defined by:

$$A_{i,j} = \frac{1}{4} \left\{ \begin{array}{l} ([\Delta y^2 + (\eta(x_i, y_i) - \eta(x_i, y_{j-1}))^2]^{1/2} + [\Delta y^2 + (\eta(x_{i-1}, y_{j-1}) - \eta(x_{i-1}, y_j))^2]^{1/2} \times \\ ([\Delta x^2 + (\eta(x_i, y_j) - \eta(x_{i-1}, y_j))^2]^{1/2} + [\Delta y^2 + (\eta(x_i, y_{j-1}) - \eta(x_{i-1}, y_{j-1}))^2]^{1/2}) \end{array} \right\}$$

A perfectly plane surface will have an Sdr of 0%. The developed surface area Sdr of the sheet according to the invention is preferably greater than 0.2% and generally less than 1%.

Advantageously, the aforementioned surfaced sheet can be manufactured by a process comprising the following steps in succession:
 (a) a semi-finished product chosen from a thin slab or a hot-rolled sheet is cold rolled;
 (b) the sheet obtained in step (a) is continuously annealed, at a temperature between 900 and 1200° C. for a time ranging from 10 seconds to 30 minutes, in an oxidizing atmosphere; and
 (c) the annealed sheet obtained from step (b) is pickled by bringing it into contact with at least one mineral acid at a temperature of between 40 and 100° C.

The subject of the invention is therefore also process for surfacing a sheet based on the aforementioned alloy, as described above.

It has been demonstrated that this process results, surprisingly, in a surface topography and also the formation of a novel passive layer, which are different from those obtained by other standard finishing means, such as bright annealing in a reducing atmosphere ($H_2$ or $H_2/N_2$), and are favourable to obtaining a low surface resistance of the material, desirable in the envisaged application.

The abovementioned rolling, annealing and pickling steps constitute metallurgical operations well known to those skilled in the art. For example, combustion furnaces may be used for carrying out the annealing in an oxidizing atmosphere. In particular, it is preferable to maintain an oxygen content close to 8%.

The cold rolling may be carried out on stainless strip having for example a thickness between 2 and 5 mm. It may be from a slab obtained by pouring molten alloy from a tundish, through a nozzle, into a mould having cold surfaces, in which the metal product starts to solidify. The walls of the mould may be stationary copper or copper alloy walls, or rolls rotating in opposite directions from each other, or endless belts. As a variant, the strip used in the above process may result from hot-rolling the aforementioned slab. The cold-rolled strip may for example have a thickness of 0.05 mm to 1.5 mm.

The acid used in the pickling step may be especially chosen from sulphuric acid, nitric acid, hydrofluoric acid and the mixtures thereof, preferably tending to have a solution whose pH is equal to 2 or less. The acid may be brought into contact with the annealed sheet in particular by spraying or by making the strip run through a container of an acid solution or through a cascade of containers (preferably three containers, such as tanks) containing identical or different acid solutions.

The surfacing process described above may include other steps than those mentioned above, carried out before or after any one of the aforementioned steps, and especially an additional electrolytic pickling step. In general, it further includes a step of rinsing, preferably with water, and then of drying the pickled sheet.

The subject of the invention is also the use of the surfaced sheet described above, preferably obtained by the aforementioned process, for the manufacture of a conducting plate (whether of the monopolar or bipolar type) for a fuel element.

The sheets (whether surfaced or not) used according to the invention in the manufacture of conducting plates are advantageously subjected to a particular cold-forming process that makes it possible to obtain the optimum plate geometries for the purpose of the intended use, and in particular the desired channel profiles, without impairing the corrosion resistance and electrical conductivity properties of the plates.

The subject of the invention is therefore also a process for manufacturing a conducting plate for a fuel cell element, comprising the surfacing by the process described above of a sheet containing an alloy as defined above, said process further including at least the following steps:
 said sheet having a thickness of 0.05 to 0.5 mm, in particular 0.1 to 0.2 mm, undergoes a first deformation by means of a first tool in order to obtain a corrugated blank; and
 said corrugated blank undergoes a second, tangential deformation by means of a second tool.

Preferably, the succession of first and second deformations gives the sheet an elongation of at least 25% to 35% relative to the initial length of the sheet.

The subject of the invention is also the plate thus obtained.

This process may be carried out in a hydraulic or mechanical press using at least two tools of different shapes. As a variant, it may be carried out using what is called a "following" tool which applies at least two successive impressions (the following ones being applied on top of the previous ones) for example to sheets measuring 10×20 cm.

The elongation conferred on the sheet in this process is expressed with respect to the initial developed length of the sheet, measured along its central part. This is a mean elongation, in so far as certain regions of the sheet will be deformed more than others.

This cold-forming process makes it possible to distribute the deformations undergone by the metal in all directions, and over the maximum area of the initial sheet, so as to best use the elongatability of the metal. This results in a profile for the incoming gas channels that is compatible with fuel cell operation (in particular, satisfactory lifetime and compactness). Furthermore, this process makes it possible to conform the sheet to the assembly, sealing and connection means for the gas inlets and outlets that will be subsequently attached to it. It should be noted that this method does not impair the surface conformation of the sheet, that is to say any particular roughness that it has, nor does it impair its low electrical resistance. Finally, this is a simpler and less expensive method than hydroforming.

A further subject of the invention is a fuel cell element comprising at least one monopolar or bipolar conducting plate comprising at least an alloy as defined above, preferably a surfaced sheet or a conducting plate such as those described above. Such a cell element conventionally comprises, apart from said plate, an anode, a cathode and an electrolyte, advantageous together with at least one diffusion layer. The electrodes may conventionally be made of a carbon, platinum or polymer layer having for example a thickness of 10 to 15 μm. A preferred electrolyte consists of a proton exchange polymer membrane which may for example have a thickness of 20 to 50 μm. In particular, it is possible to use a diffusion layer of the "woven" type, such as the CARBEL CL model sold by W.L. Gore & Associates, or a diffusion layer of the "felt" type, such as the 30BC model sold by SGL. In general, this is a porous material containing carbon fibres with a diameter of 5 to 40 μm.

Yet another subject of the invention is a fuel cell, in particular of the PEMFC (proton exchange membrane fuel cell) type, containing such a cell element.

The fuel cells according to the invention may be used for supplying electricity to a vehicle, such as a motor vehicle, or a telecommunication means, such as a relay antenna or a mobile telephone.

Another subject of the present invention is therefore the use of fuel cells as defined above for supplying electricity to a vehicle, such as a motor vehicle, or a telecommunication means, such as a relay antenna or a mobile telephone.

BRIEF DESCRIPTION OF THE DRAWINGS

The invention will now be described with reference to the appended FIGS. 1 to 14, in which.

DETAILED DESCRIPTION OF THE INVENTION

Figure 1:
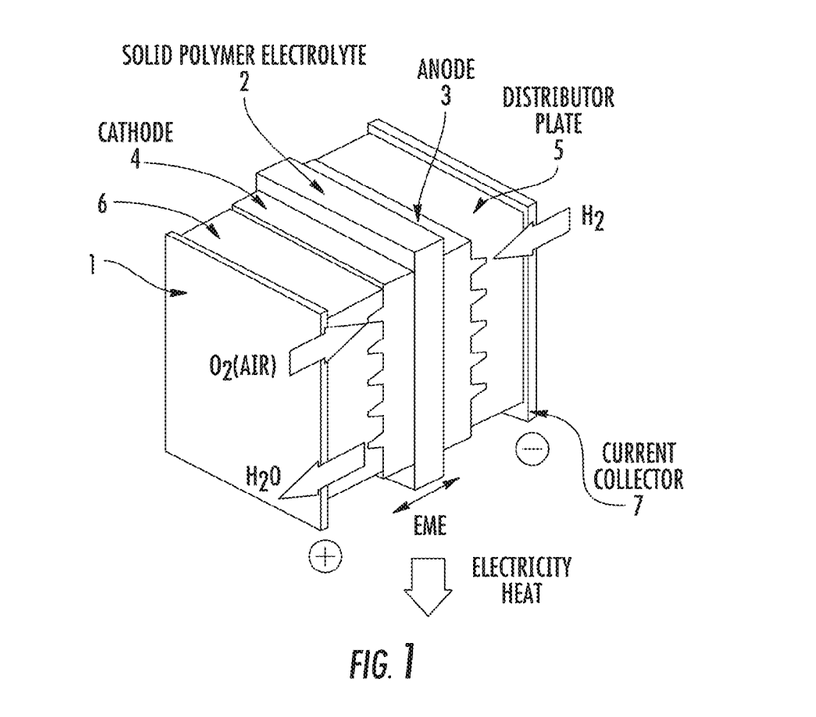
FIG. 1 illustrates the operating principle of a fuel cell.

FIG. 1 illustrates a conventional fuel cell element. The cell element 1 illustrated contains an electrolyte 2 interposed between an anode 3 and a cathode 4, each being in contact with an anode plate 5 and a cathode plate 6, respectively. The cell consists of a stack of cell elements 1, such as that illustrated in FIG. 1, which are joined together between two current collectors, one of which, the current collector 7, is shown in this figure.

The invention will be more clearly understood on reading the following examples, which are given by way of indication but imply no limitation.

EXAMPLES

Example 1

Manufacture of a Surfaced Alloy Sheet According to the Invention

A surfaced sheet was manufactured from the alloy SUPER-IMPHY® SY286 from Imphy Alloys, the precise composition of which was:
  24.43% nickel
  14.79% chromium
  2.14% titanium
  1.46% molybdenum
  0.306% vanadium
  0.037% carbon
  1.71% manganese
  0.085% silicon
  0.168% aluminium
  at most 0.0005% sulphur
  0.015% phosphorus.

To do this, a hot-rolled sheet with a thickness of 4 mm was used, which was cold-rolled in several passes with an intermediate annealing treatment between each cold-rolling pass, so as to obtain a strip thickness of around 0.2 mm. After the last rolling pass, the strip was annealed according to the invention at 1080° C. in an open combustion continuous furnace 27 m in length at a run speed of 20 m/min, the oxygen content in the reducing atmosphere being about 8%. The strip obtained was then pickled by passing it through three successive baths:
  Bath 1: electrolytic pickling by direct polarization in a 150 g/l sodium sulphate bath at a temperature of 75° C.,
  Bath 2: electrolytic pickling in a 70 g/l nitric acid bath at a temperature of 40° C.; and
  Bath 3: mixture of 100 g/l nitric acid and 20 g/l hydrofluoric acid, at a temperature of 50° C.

The sheet obtained had a thickness of 0.2 mm and an arithmetic mean roughness Sa of 0.23 μm. The calculated St and Sdr values were 2.16 μm and 0.344%, respectively.

Example 2

Figure 2:
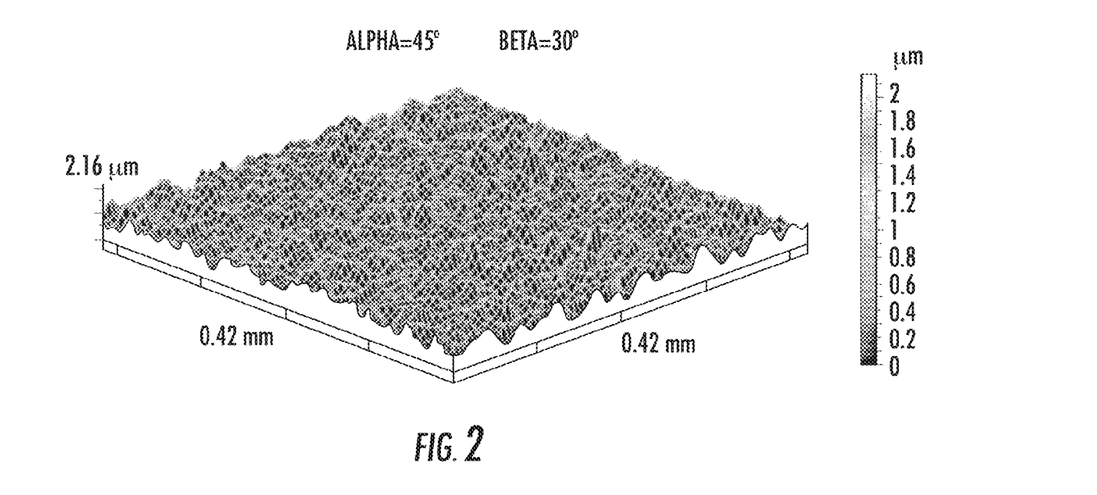
FIG. 2 is a latticed representation of the surface of a stainless steel sheet manufactured by the process according to the invention.
Figure 3:
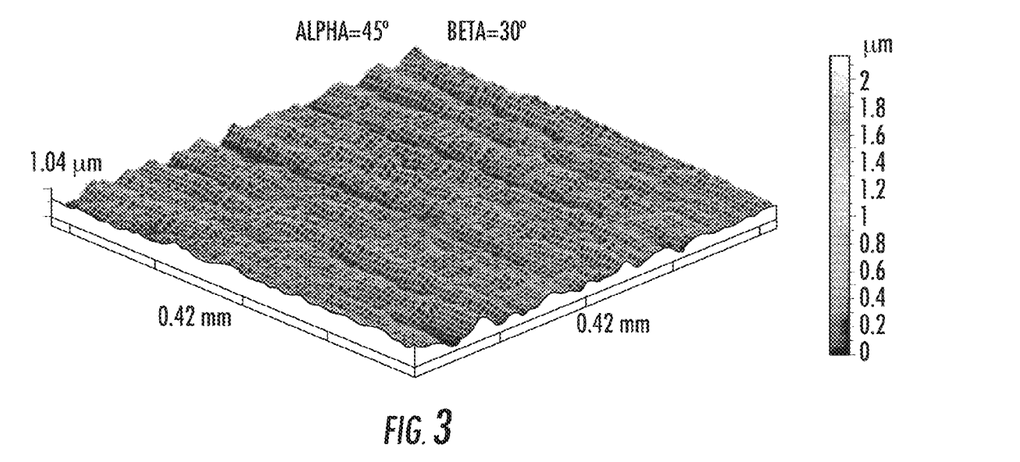
FIG. 3 is a latticed representation of a stainless steel sheet manufactured by a process that involves annealing in a reducing atmosphere.

Evaluation of the Surface Finish as a Function of the Sheet Manufacturing Process FIG. 2 illustrates the surface finish of a sheet manufactured under conditions similar to those of example 1, which appears to consist of a multitude of bumps. Its surface is characterized by an arithmetic mean roughness Sa of 0.186 μm, a maximum height amplitude St of 2.16 μm and a developed surface area Sdr of 0.344%. FIG. 3 illustrates, for comparison, a sheet manufactured from the same SUPERIMPHY®. SY286 alley by a process that involves an annealing step in a reducing atmosphere, the surface of which has a succession of protuberances. The surface of this sheet is further characterized by an arithmetic mean roughness Sa of 0.106 μm, a maximum height amplitude St of 1.04 μm and a developed surface area Sdr of 0.0767%.

Figure 4:
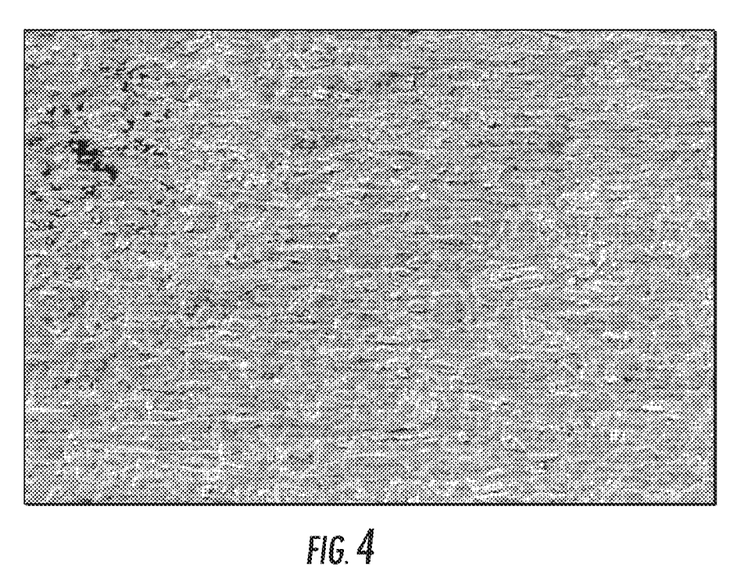
FIG. 4 illustrates the surface topography, displayed by scanning electron microscopy, of a stainless steel sheet manufactured by the process according to the invention.
Figure 5:
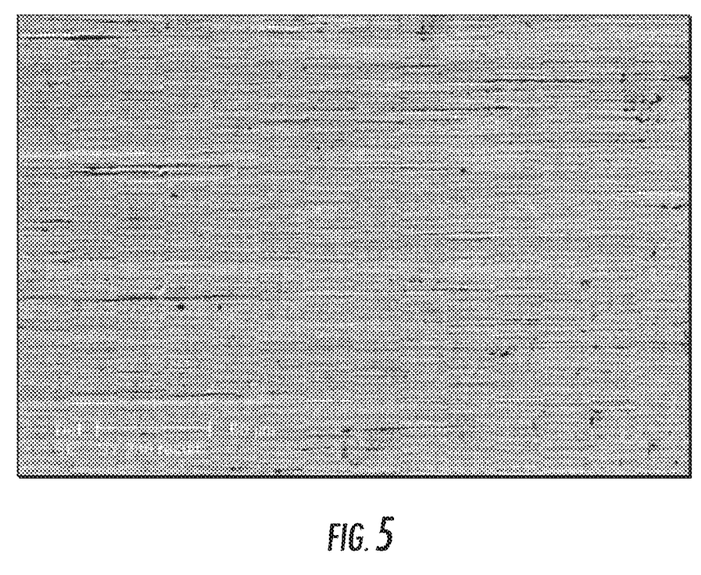
FIG. 5 illustrates the surface topology, displayed by scanning electron microscopy, of a stainless steel sheet manufactured by a process that involves annealing in a reducing atmosphere.

Furthermore, as is apparent from FIGS. 4 and 5, the surface topographies displayed by scanning electron microscopy, of the sheet according to the invention and the sheet annealed in a reducing atmosphere ($H_2$) respectively, are very different.

It therefore appears that an SY286 alloy sheet surfaced by the process according to the invention has a characteristic rough surface that cannot be obtained by a conventional process of annealing in a reducing atmosphere.

Example 3

Evaluation of the Electrical Surface Resistance as a Function of the Nature of the Alloy The electrical contact resistance of three surfaced alloy sheets, having received the same surface treatment, consisting of the alloy grades F17TNb, A286 (alloy SY286) and 316L respectively, were compared as a function of the assembly pressure exerted on each of these sheets in order to join them to an identical diffusion layer.

Figure 6:
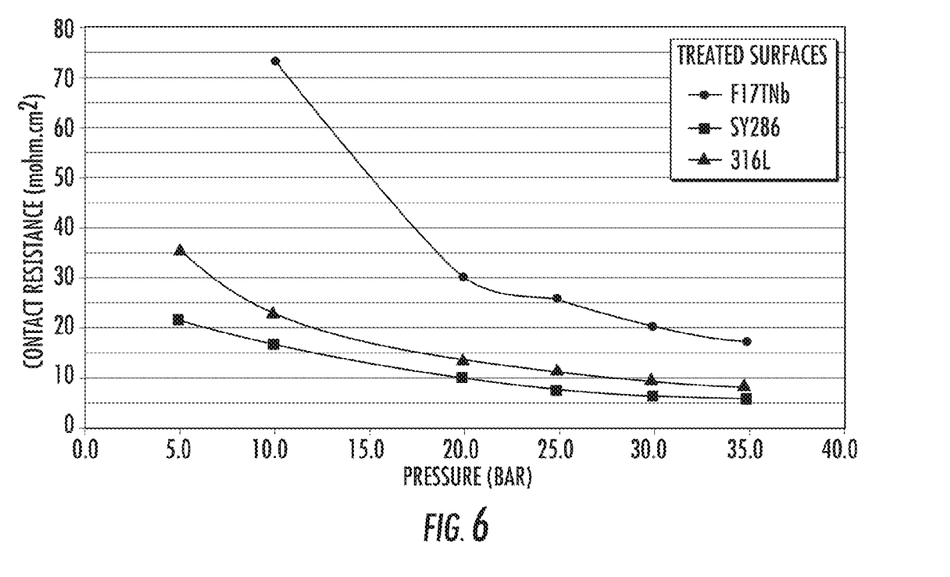
FIGS. 6 and 7 are curves illustrating the contact resistance of conducting plates made of stainless steel having various chemical compositions, as a function of the pressure exerted on the plate/GDL contact region.

The results illustrated in FIG. 6 show that the A286 alloy sheet used according to the invention offers the lowest contact resistance and therefore the best conducting capability.

A similar measurement was carried out using non-surfaced sheets of SY286 alloy and 904L alloy, which contain similar quantities of nickel.

Figure 7:
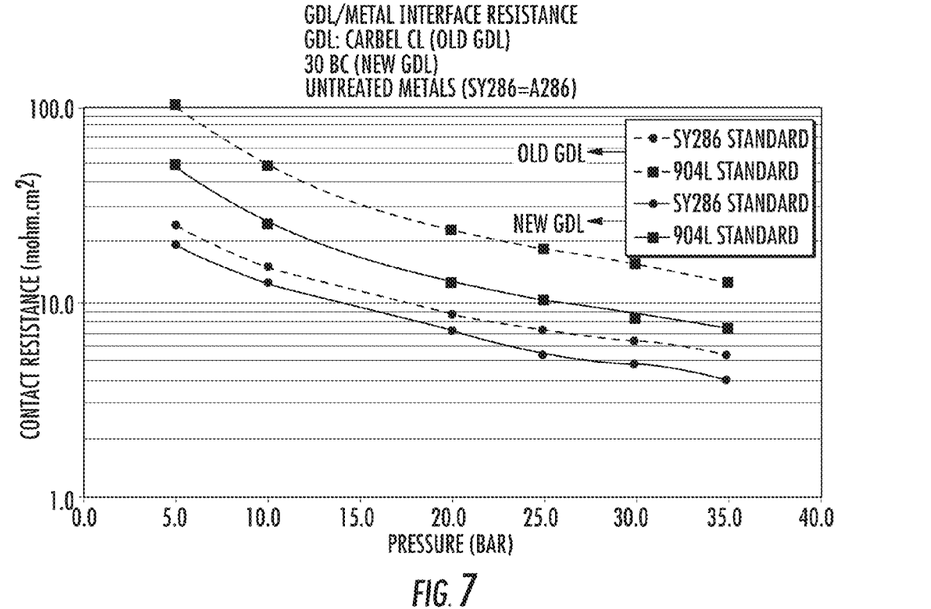

FIG. 7 shows that, for two different types of gas diffusion layer (GDL), the contact resistance obtained with alloy SY286 is, here again, the lowest.

From these experiments it is clear that the alloy used according to the invention is a better candidate than the alloys of the prior art for manufacturing conducting plates for fuel cells.

Example 4

Figure 8:
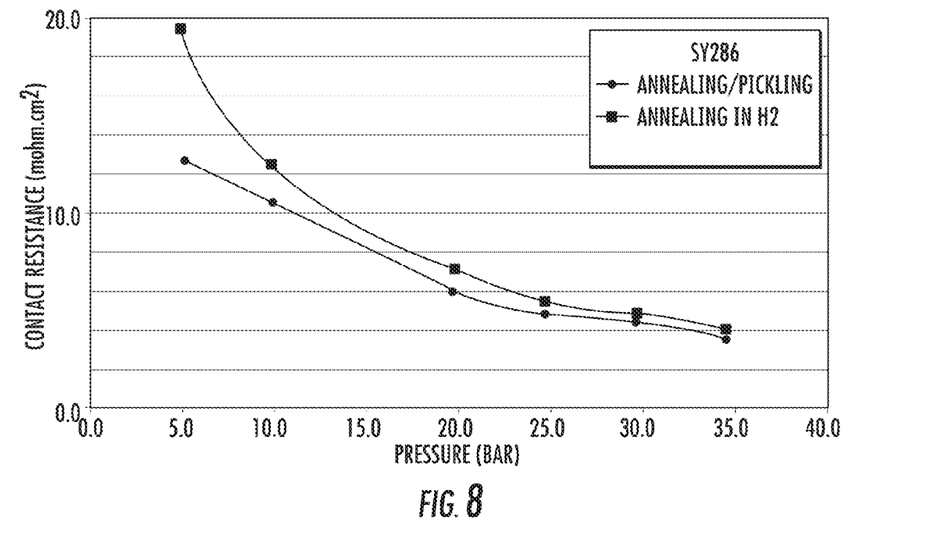
FIG. 8 is a curve illustrating the contact resistance of stainless steel sheets obtained by various processes, as a function of the pressure exerted on the plate/GDL contact region.

Evaluation of the Electrical Surface Resistance as a Function of the Sheet Manufacturing Process The electrical contact resistance of two SY286 alloy sheets described in Example 2 was compared as a function of the assembly pressure exerted on each of these sheets in order to join them to an identical diffusion layer. As shown in FIG. 8, the surfacing process according to the invention makes it possible to obtain a sheet having a better conductivity than the sheet prepared according to the conventional process of annealing in hydrogen.

Example 5

Comparison of the Performance of Cells Based on Various Alloys

The performance, namely the cell voltage as a function of the current density, was compared, its fuel cells differing from one another by the chemical nature of the material making up their conducting plates. The experiments were carried out at an air pressure of 1.1 bar, a hydrogen pressure of 1.25 bar and a cell temperature of 60° C.

Figure 9:
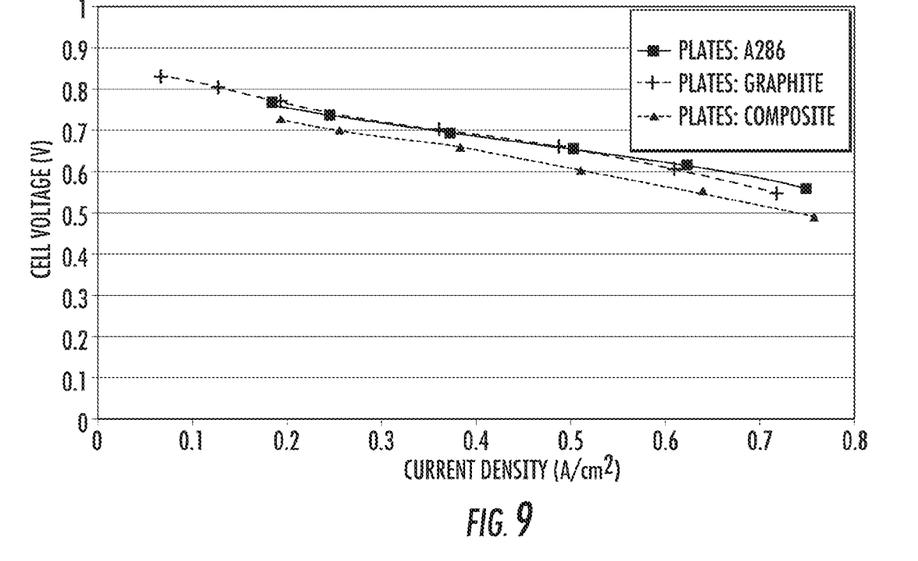
FIG. 9 illustrates the polarization curves for fuel cell elements comprising various types of conducting plate.

As apparent from FIG. 9, the surfaced SY286 alloy plate according to the invention, profiled by a process that includes at least two cold-forming steps, makes it possible to obtain a fuel cell having an electrical performance close to that of a cell based on machined graphite (no significant difference) and better than that of a cell based on a carbon/polymer composite.

Figure 10:
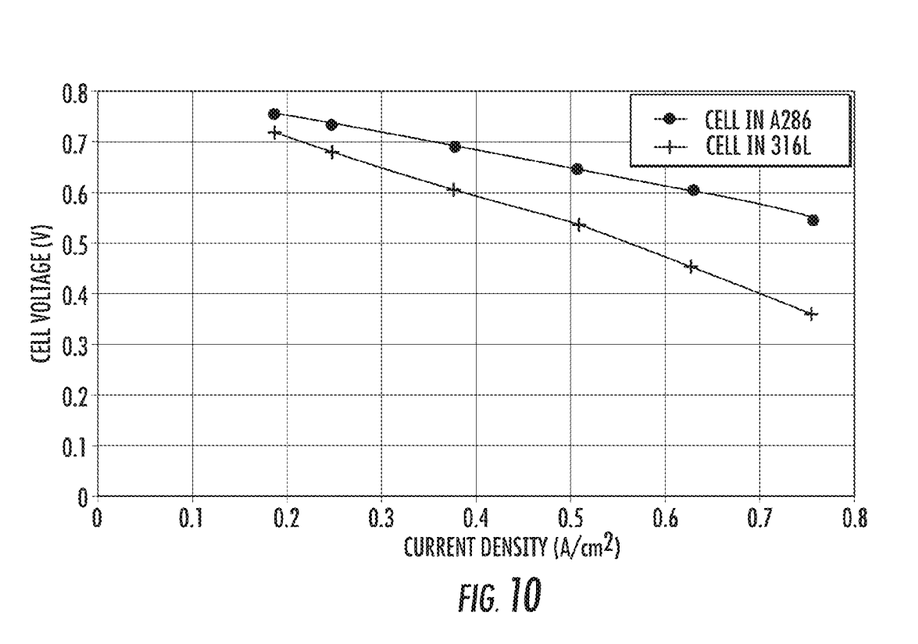
FIG. 10 illustrates the polarization curves for fuel cell elements comprising plates made of stainless steel of different chemical compositions.

Furthermore, FIG. 10 shows that the electrical performance of a fuel cell according to the invention, tested under the abovementioned conditions, is better than that cell manufactured from plates made of 316l, alloy, which is the reference.

Example 6

Long-Term Cycling Test

A long-term cycling test was carried out over 500 hours in order to simulate (under the conditions of Example 6 and with a current density of 0.6 A/cm$^2$) one way of stressing a fuel cell according to the invention, representative of its use as a portable generator.

Figure 11:
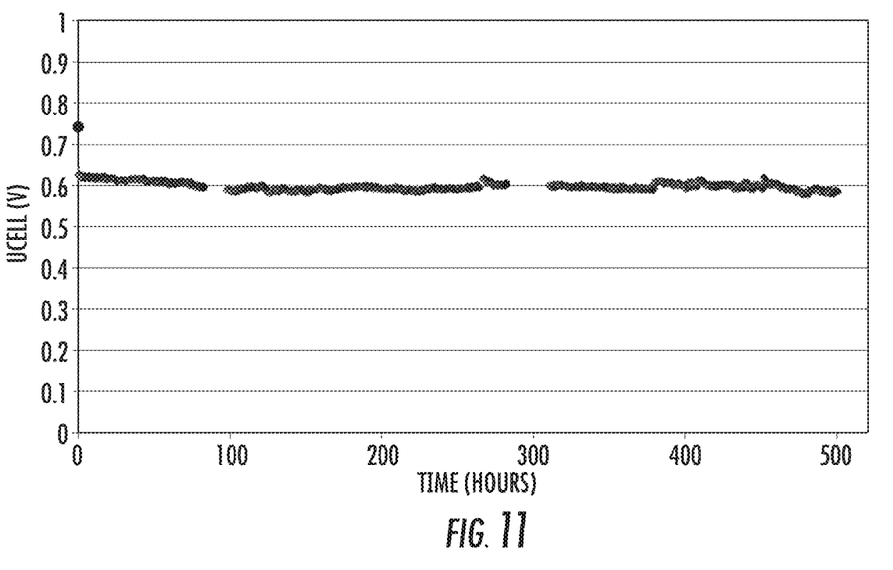
FIG. 11 illustrates a "portable generator"-type cycling durability test of a fuel cell element according to the invention.

The result of this test, illustrated in FIG. 11, shows the chemical stability of the conducting plate according to the invention with respect to oxidation in the fuel cell medium. The reductions in performance per unit time are identical, within the precision of the measurement, to those observed in the case of graphite plates or carbon/polymer composite plates.

What is claimed is:
1. A fuel cell element comprising:
a first conducting plate and a second conducting plate, wherein said first conducting plate has at least one face with an arithmetic roughness Sa of 0.12 μm or higher and a maximum height amplitude St of less than 4 μm,
an active core comprising an anode, a cathode, and an electrolyte interposed between said anode and said cathode,
said active core being interposed between said first and second conducting plates,
wherein at least said first conducting plate comprises at least one alloy having, in percentages by weight:
24.0 to 27.0% nickel;
13.5 to 16.0% chromium;
1.90 to 2.35% titanium;
1.0 to 1.5% molybdenum;
0.10 to 0.50% vanadium;
at most 0.08% carbon;
at most 2.0% manganese;
at most 1.0% silicon;
at most 0.35% aluminium;
at most 0.03% sulphur; and
at most 0.01% boron,
the balance consisting of iron and impurities.
2. The fuel cell element according to claim 1, wherein the alloy contains:
24.0 to 25.5% nickel;
14.0 to 16.0% chromium;
2.00 to 2.30% titanium;
1.2 to 1.5% molybdenum;
0.10 to 0.50% vanadium;
at most 0.06% carbon;
at most 2.0% manganese;
at most 0.3% silicon;
at most 0.25% aluminium;
at most 0.01% sulphur;
and at most 0.01% boron,
the balance consisting of iron and impurities.
3. The fuel cell element according to claim 1 wherein the electrolyte is a proton exchange membrane.
4. The fuel cell element according to claim 1, wherein said face has a developed surface area Sdr of greater than 0.2%.
5. The fuel cell element according to claim 1, wherein said first conducting plate can be obtained by a manufacturing process comprising the surfacing of a sheet containing said alloy, said process comprising the following steps in succession:
(a) a semi-finished product chosen from a thin slab or a hot-rolled sheet is cold rolled;

(b) the sheet obtained in step (a) is continuously annealed, at a temperature between 900 and 1200° C. for a time ranging from 10 seconds to 30 minutes, in an oxidizing atmosphere; and (c) the annealed sheet obtained from step (b) is pickled by bringing it into contact with at least one mineral acid at a temperature of between 40 and 100° C., wherein the manufacturing process further includes at least the following steps:

said sheet having a thickness of 0.05 to 0.5 mm, in particular 0.1 to 0.2 mm, undergoes a first deformation by means of a first tool in order to obtain a corrugated blank; and said corrugated blank undergoes a second, tangential deformation by means of a second tool.

6. The fuel cell element according to claim 1, wherein said first and second conducting plates include channels for the flow of feed gases and the discharge of water.

7. The fuel cell element according to claim 1 wherein the alloy has a percentage by weight of chromium of less than 16.0%.

8. A fuel cell containing at least one fuel cell element according to claim 1.

9. A method for supplying electricity to a vehicle, or a telecommunication means comprising the step of providing the fuel cell according to claim 8.

10. The fuel cell according to claim 8 wherein the fuel cell is a photon exchange membrane fuel cell (PEMFC) type.

* * * * *